(12) United States Patent
Engelhardt et al.

(10) Patent No.: US 7,424,353 B2
(45) Date of Patent: Sep. 9, 2008

(54) SAFETY DEVICE FOR A MOTOR VEHICLE

(75) Inventors: Konrad Engelhardt, Weil der Stadt (DE); Dominic Reutter, Birenbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/591,672

(22) PCT Filed: Feb. 26, 2005

(86) PCT No.: PCT/EP2005/002062

§ 371 (c)(1),
(2), (4) Date: Oct. 27, 2006

(87) PCT Pub. No.: WO2005/085015

PCT Pub. Date: Sep. 15, 2005

(65) Prior Publication Data

US 2007/0208473 A1 Sep. 6, 2007

(30) Foreign Application Priority Data

Mar. 4, 2004 (DE) .................. 10 2004 010 542

(51) Int. Cl.
*B60R 22/00* (2006.01)

(52) U.S. Cl. .................. 701/45; 180/274; 180/271; 280/735; 454/75

(58) Field of Classification Search .................. 701/45; 180/271, 281, 274; 280/735; 454/75
See application file for complete search history.

(56) References Cited

U.S. PATENT DOCUMENTS

| 5,246,083 | A |   | 9/1993  | Graf et al. |
| 5,323,872 | A | * | 6/1994  | Yabe .......................... 180/271 |
| 5,574,315 | A | * | 11/1996 | Weber ........................ 307/10.1 |

FOREIGN PATENT DOCUMENTS

| DE | 40 31 552 C2   | 4/1992  |
| DE | 44 11 184 C2   | 10/1994 |
| DE | 198 23 877 A1  | 12/1998 |
| DE | 199 61 799 B4  | 7/2001  |
| DE | 101 28 141 C2  | 1/2002  |
| DE | 101 09 262 A1  | 6/2002  |
| DE | 101 21 386 C1  | 8/2002  |
| DE | 101 48 340 A1  | 4/2003  |
| WO | WO 01/45985 A1 | 6/2001  |

OTHER PUBLICATIONS

International Search Report dated May 12, 2005 with an English translation of the pertinent portion (eight (8) pages).
German Search Report dated Aug. 11, 2004 with an English translation of the pertinent portion (eight (8) pages).

* cited by examiner

*Primary Examiner*—Mark Hellner
(74) *Attorney, Agent, or Firm*—Crowell & Moring LLP

(57) ABSTRACT

A safety device for a motor vehicle has at least one closable opening of the interior, and a closing element driven by a servo drive for closing the opening. A control unit evaluates the data relevant to safety when the vehicle is in motion and activates the servo drive at such a time that the closing element is moved into a predetermined position, in which the closable opening has an open gap prior to the occurrence of an expected accident.

8 Claims, 1 Drawing Sheet

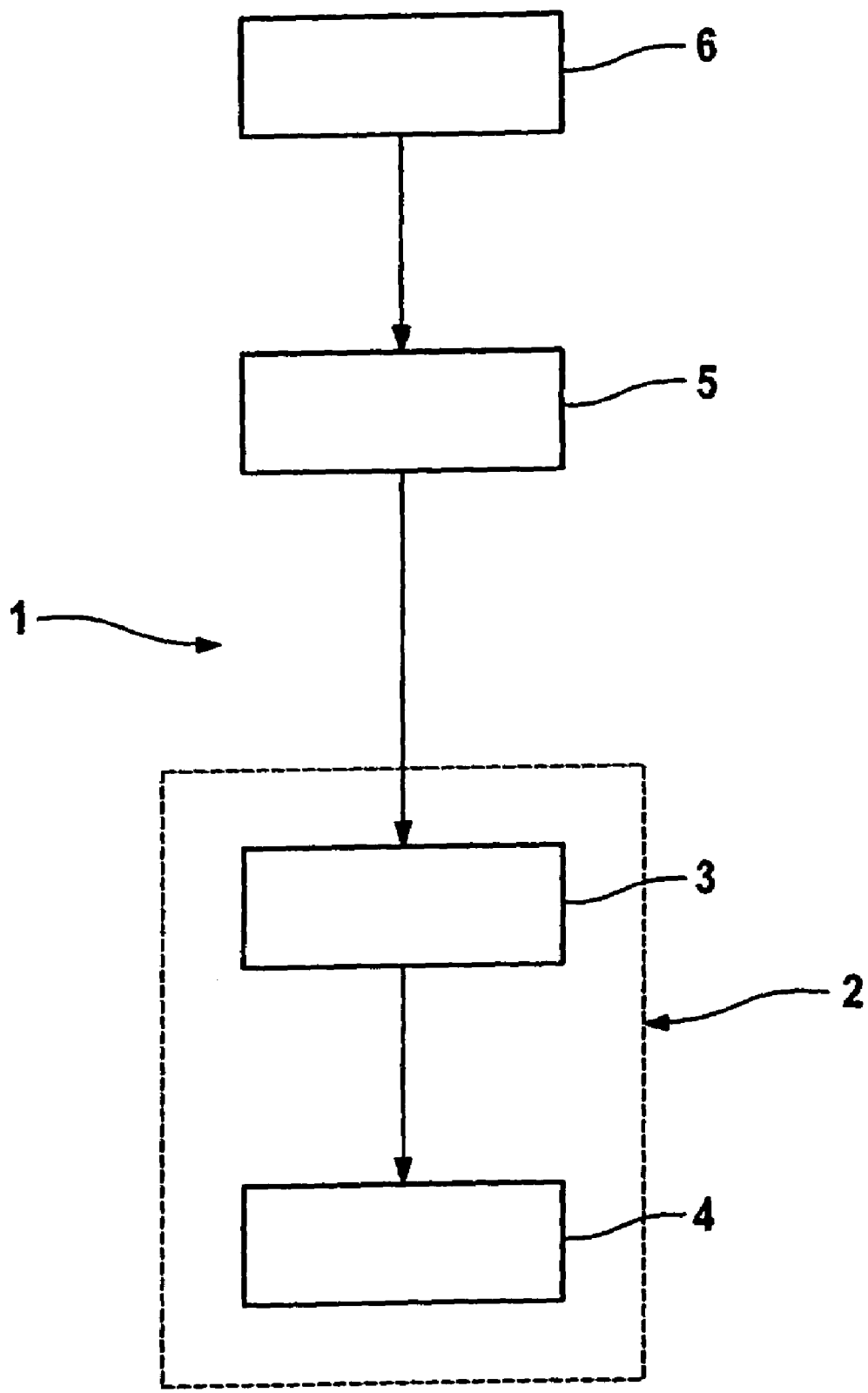

SAFETY DEVICE FOR A MOTOR VEHICLE

BACKGROUND AND SUMMARY OF THE INVENTION

This application is a National Phase of PCT/EP2005/002062, filed Feb. 26, 2005, and claims the priority of DE 10 2004 010 542.1, filed Mar. 4, 2004, the disclosures of which are expressly incorporated by reference herein.

The present invention relates to a safety device for a motor vehicle comprising at least one closable opening of the interior.

DE 40 31 552 A1 discloses a safety device for a vehicle, the interior of which has at least one opening, for example a side window, which can be closed or opened, according to choice, by a closing element coupled to a servo drive. A sensor system senses the vehicle deceleration in the traveling direction and, if a default value for the vehicle deceleration is exceeded, initiates the closing movement of the closing element. Given suitable selection of the default value for the vehicle deceleration, the opening can already be closed before the motor vehicle hits an obstacle. If an accident actually occurs, the occupants of the vehicle are protected from injuries caused by foreign bodies entering the vehicle from the outside through the opening. It is similarly possible to avoid occupants of the vehicle being thrown out through the opening.

DE 101 21 386 C1 describes a method for activating a reversible occupant protection means in a motor vehicle with a sensor system sensing driving state data.

Instances of emergency braking, oversteering and understeering of the motor vehicle are monitored as driving state data. On the basis of such a state, the occupant protection means is triggered. The driving state data can also be used to determine the direction from which the greatest danger is to be expected. The occupant protection means is activated in such a way that the protective effect is provided in accordance with the direction of greatest danger.

Furthermore, DE 44 11 184 C2 discloses a restraining belt system for a seat in a vehicle, comprising a seat belt and a belt tensioner for securing a passenger on the seat. The device determines the distance from an object and the corresponding relative velocity. This can be used to determine the expected time to a possible collision between the vehicle and the object. A control unit generates a control signal, which increases the force of the belt tensioner at an appropriate time before the possible collision. If a collision can be avoided, the force of the belt tensioner is reduced again. The controllable belt tensioner is configured as a pretensioner, which before the collision is active only up to a predetermined pretension, a further belt tensioner being triggered for tighter tensioning of the seat belt if the collision is actually found to have occurred.

An object of the present invention is to provide a safety device for a motor vehicle comprising at least one closable opening of the interior, with a closing element driven by a servo drive being provided for closing the opening, which device has improved occupant protection in comparison with known safety devices.

The foregoing object is achieved by a safety device for a motor vehicle comprising at least one closable opening of the interior in which a control unit evaluates the data relevant to safety when the vehicle is in motion and activates the servo drive at such a time that the closing element is moved from an open position in the closing direction into a predetermined position, in which the closable opening has an open gap, prior to the occurrence of an expected accident.

According to the present invention, the control unit evaluates the data relevant to safety when the vehicle is in motion and activates the servo drive at such a time that the closing element for closing the opening is moved into the predetermined position, in which the closable opening has an open gap, prior to the occurrence of an expected accident. The safety device for the motor vehicle comprises at least one closable opening of the interior of the motor vehicle, the closing element that is driven by the servo drive being provided for closing the opening, and the control unit.

The safety device according to the invention ensures that, in the event of an accident occurring, adequate oxygen is supplied and made available to the occupants of the motor vehicle. In the event of an accident, there may be high levels of contamination from gas or soot particles, for example as a result of pyrotechnic occupant protection device being triggered, representing a high degree of risk to the health of the occupants. The opening, left open by a gap, for example a side window, allows the gas or soot particles to escape from the interior of the motor vehicle into the surroundings and at the same time allows oxygen to be supplied from the outside to the occupants in the interior. In this case, it is advantageous that the closing element can be moved into the predetermined position both from an open position and from the closed position. The predetermined position for the closing element is already reached before the occurrence of the actual accident, thereby achieving additional safety for the occupants.

Movement of the closing element into the predetermined position while the accident is actually in progress could no longer occur under some circumstances, on account of failure of the voltage supply. The time immediately before the accident is used to initiate precautionary measures to improve occupant safety. The safety device acting with a preventive effect ensures preventive occupation protection.

The closing element may be any automatically closable component of the motor vehicle, for example a windowpane or a sliding roof.

The data relevant to safety when the vehicle is in motion may be, in particular, driving state variables. Variables such as vehicle speed, yaw, longitudinal and lateral accelerations, brake pedal and gas pedal positions and the steering angle may be used as driving state variables. Furthermore, the status of operating elements such as turn indicators and hazard warning lights as well as the status of sensors and control devices concerning the motor vehicle may also be used.

As an alternative or in addition, the data relevant to safety when the vehicle is in motion may be ambient data. Ambient data is the term used to refer to data provided by ambient sensors, telematic systems and communication of the motor vehicle with other motor vehicles and stationary communication systems. Examples of ambient data are information on the current location, on the category of road and on the lane in which one's own motor vehicle is driving. Other ambient data include the state of the road, temperature, weather, light conditions and the speed, distance, type and size of motor vehicles and other road users ahead, alongside, following or oncoming.

It is also advantageous if the data relevant to safety when the vehicle is in motion are evaluated driver activities. Sensing driver activity comprises, for example, detecting eye movement and viewing direction, but also operating actions on operating elements such as, for example, the steering wheel, gear selector lever and brake pedal. By evaluating a safety-relevant data the correct point in time for closing the tilting roof can be determined, if need be, by the control unit.

Other objects, advantages and novel features of the present invention will become apparent from the following detailed description of the invention when considered in conjunction with the accompanying drawings.

BRIEF DESCRIPTION OF THE DRAWINGS

The sole FIGURE—is a schematic showing of a detail of a safety device for a motor vehicle comprising at least one closable opening of the interior.

DETAILED DESCRIPTION OF THE DRAWINGS

According to the sole FIGURE, a safety device designated generally by numeral 1 for a motor vehicle includes a closable opening of the motor vehicle interior 2. A closing element 4 driven by a servo drive 3 is provided for closing the opening.

A control unit 5 evaluates the data 6 relevant to safety when the vehicle is in motion and activates the servo drive 3 at such a time that the closing element 4 is moved into a predetermined position, in which the closable opening has an open gap, prior to the occurrence of an expected accident. The closing element 4 can be moved into the predetermined position both from an open position and from the closed position. The closing element 4 may be configured, for example, as a side window or as a sliding roof of the motor vehicle.

The servo drive 3 may additionally have a quick closing function, which is activated when the servo drive 3 is activated by the control unit 5. The quick closing function of the servo drive 3 ensures that the closing element 4 has reached its end position with the open gap at an appropriate time before the occurrence of the actual accident. The quick closing function may also be realized in a separate servo drive 3. If the accident does not occur, the closing element 4 is returned again to its starting position.

The size of the gap can be individually preset, depending on the configuration of the closing element 4. The presetting may take place at the factory or be performed by an occupant of the motor vehicle.

The safety device 1 may also activate a number of closing elements 4, for example a number of side windows of the motor vehicle. The activation of the side windows may take place in various operating modes. In a first operating mode, all the side windows can be moved into a predetermined position at the same time. In a second operating mode, only the windows that are next to an occupant are activated. Occupant sensing may be carried out by way of a seat occupancy detection. Other operating modes for the safety device 1 are also contemplated as within the scope of the present invention.

The data 6 relevant to safety when the vehicle is in motion are driving state variables, ambient data and/or evaluated driver activities.

The safety device 1 according to the present invention for the motor vehicle having the closable opening of the interior 2 ensures a secured supply of oxygen to the occupants of the motor vehicle during and after an accident. The safety device 1 can be implemented with little expenditure, because the main components of the safety device 1 are generally already integrated in the motor vehicles as standard items.

The invention claimed is:

1. A safety device for a motor vehicle, comprising at least one closable opening of the interior, a closing element driven by a servo drive for closing the opening, and a control unit is configured to evaluate safety-related data when the motor vehicle is in motion and to activate the servo drive at such time that the closing element is moved from an open position in a closing direction or from a closed position in an opening direction into an intermediate position, in which the opening has become substantially closed but still has an open gap upon occurrence of an anticipated accident.

2. The safety device as claimed in claim 1, wherein a size of the open gap is an individually preset table.

3. The safety device as claimed in claim 1, wherein the closing element is one of a side window and a sliding roof.

4. The safety device as claimed in claim 1, wherein the servo drive is configured to have a quick closing function activateable by the control unit upon activation of the server drive.

5. The safety device as claimed in claim 1, wherein the safety-related data comprise driving state variables.

6. The safety device as claimed in claim 1, wherein the safety-related data comprise ambient data.

7. The safety device as claimed in claim 1, wherein the safety-related data comprise evaluated driver activities.

8. The safety device as claimed in claim 1, wherein the closing element is returned to its original position in the event the anticipated accident does not occur.

* * * * *